US009606619B2

(12) United States Patent
Palin et al.

(10) Patent No.: US 9,606,619 B2
(45) Date of Patent: Mar. 28, 2017

(54) METHOD AND APPARATUS FOR ACCEPTING THIRD-PARTY USE OF SERVICES BASED ON TOUCH SELECTION

(71) Applicant: Nokia Technologies Oy, Espoo (FI)

(72) Inventors: Arto T. Palin, Viiala (FI); Vesa-Veikko Luukkala, Espoo (FI)

(73) Assignee: Nokia Technologies Oy, Espoo (FI)

( * ) Notice: Subject to any disclaimer, the term of this patent is extended or adjusted under 35 U.S.C. 154(b) by 170 days.

(21) Appl. No.: 13/766,321

(22) Filed: Feb. 13, 2013

(65) Prior Publication Data

US 2014/0229859 A1  Aug. 14, 2014

(51) Int. Cl.
G06F 3/00 (2006.01)
G06F 3/01 (2006.01)

(52) U.S. Cl.
CPC ......... G06F 3/01 (2013.01); *H04M 2215/725* (2013.01)

(58) Field of Classification Search
CPC .............................................. H04M 2215/725
USPC ........................................................ 715/753
See application file for complete search history.

(56) References Cited

U.S. PATENT DOCUMENTS

| | | | |
|---|---|---|---|
| 6,856,676 B1 * | 2/2005 | Pirot ................. | H04L 29/06027 379/201.01 |
| 7,330,717 B2 * | 2/2008 | Gidron .................. | G06Q 30/04 455/405 |
| 8,577,810 B1 * | 11/2013 | Dalit ....................... | G06F 21/32 705/1.1 |
| 8,892,662 B2 * | 11/2014 | Moore ................. | G06Q 20/085 379/114.01 |
| 8,943,046 B2 * | 1/2015 | Chow .................... | G06Q 50/01 707/723 |
| 8,965,285 B2 | 2/2015 | Palin et al. | |
| 2004/0008672 A1 * | 1/2004 | Kobylarz .............. | H04M 15/00 370/352 |
| 2005/0198029 A1 | 9/2005 | Pohja et al. | |

(Continued)

FOREIGN PATENT DOCUMENTS

WO    2008103991 A2    8/2008

OTHER PUBLICATIONS

Using Smart Phones to Access Site-Specific Services, vol. 4, No. 2, pp. 60-66, Apr.-Jun. 2005, Eleanor Toye et al. (2005 IEEE).*

(Continued)

*Primary Examiner* — William Titcomb
(74) *Attorney, Agent, or Firm* — Alston & Bird LLP

(57) ABSTRACT

An approach is provided for brokering resources and services among multiple devices based on one or more touch-based interactions. An access platform causes, at least in part, at least one initiation of one or more touch-based interactions with at least one first device, at least one third device, or a combination thereof based, at least in part, on at least one connection request from the at least one first device, the at least one third device, or a combination thereof. The access platform determines the one or more touch-based interactions with the at least one first device, the at least one third device, or a combination thereof. The access platform further causes, at least in part, at least one access to one or more services associated with at least one second device based, at least in part, on the one or more touch-based interactions.

18 Claims, 12 Drawing Sheets

(56) References Cited

U.S. PATENT DOCUMENTS

| | | | |
|---|---|---|---|
| 2006/0073808 A1* | 4/2006 | Buchert | H04M 15/00 455/406 |
| 2007/0249288 A1 | 10/2007 | Moallemi et al. | |
| 2008/0035724 A1* | 2/2008 | Vawter | G06Q 20/20 235/380 |
| 2008/0041937 A1* | 2/2008 | Vawter | G06Q 20/367 235/380 |
| 2008/0052091 A1* | 2/2008 | Vawter | G06Q 20/10 705/39 |
| 2008/0208744 A1* | 8/2008 | Arthur | G06Q 20/105 705/41 |
| 2009/0170432 A1* | 7/2009 | Lortz | G06F 8/61 455/41.1 |
| 2009/0254669 A1* | 10/2009 | Deprun | H04W 12/06 709/229 |
| 2009/0281947 A1* | 11/2009 | Erel | G06Q 20/40 705/44 |
| 2010/0078471 A1* | 4/2010 | Lin | G06Q 40/02 235/379 |
| 2010/0078472 A1* | 4/2010 | Lin | G06Q 20/32 235/379 |
| 2010/0082444 A1* | 4/2010 | Lin | G06Q 20/042 705/17 |
| 2010/0082481 A1* | 4/2010 | Lin | G06Q 20/042 705/41 |
| 2010/0278345 A1 | 11/2010 | Alsina et al. | |
| 2010/0303230 A1* | 12/2010 | Taveau | G06Q 20/02 380/30 |
| 2010/0306531 A1* | 12/2010 | Nahari | H04L 9/3218 713/156 |
| 2011/0141953 A1* | 6/2011 | Wright | H04L 63/123 370/310 |
| 2011/0258689 A1 | 10/2011 | Cohen et al. | |
| 2011/0263196 A1* | 10/2011 | Saros | H04L 12/1859 455/3.01 |
| 2011/0314153 A1 | 12/2011 | Bathiche et al. | |
| 2011/0319017 A1 | 12/2011 | Lee et al. | |
| 2012/0266258 A1* | 10/2012 | Tuchman | H04L 63/104 726/28 |
| 2012/0297088 A1* | 11/2012 | Wang | H04L 63/0272 709/238 |
| 2013/0018975 A1 | 1/2013 | Higgins | |
| 2013/0023255 A1 | 1/2013 | Yang et al. | |
| 2013/0218721 A1* | 8/2013 | Borhan | G06Q 20/322 705/26.41 |
| 2013/0232083 A1* | 9/2013 | Smith | G06Q 20/3278 705/67 |
| 2013/0281021 A1 | 10/2013 | Palin et al. | |
| 2013/0283351 A1 | 10/2013 | Palin et al. | |
| 2013/0331031 A1* | 12/2013 | Palin | H04W 52/0245 455/41.2 |
| 2014/0020068 A1* | 1/2014 | Desai | H04L 63/10 726/4 |
| 2014/0194062 A1* | 7/2014 | Palin | H04W 4/008 455/41.2 |
| 2016/0087933 A1* | 3/2016 | Johnson | H04L 61/1564 709/245 |

OTHER PUBLICATIONS

Stackoverflow, "Proximity-based fob security device with bluetooth: how it works," web page retrieved May 13, 2013, pp. 1-2, Retrieved from: http://stackoverflow.com/questions/7800335/proximity-based-fob-security-device-with-bluetooth-how-it-works.

International Search Report for related International Application No. PCT/FI2014/050023, mailed Apr. 2, 2014, 5 pages.

Notification of Transmittal of the International Search Report and the Written Opinion of the International Searching Authority, or the Declaration along with Written Opinion for related International Application No. PCT/FI2014/050023, mailed Apr. 2, 2014, 13 pages.

Seewoonauth et al., "NFC-Based Mobile Interactions with Direct-View Displays", Lecture Notes in Computer Science; vol. 5726, Human-Computer Interaction—INTERACT 2009: 12th IFIP TC 13 International Conference, Aug. 24-28, 2009, Uppsala, Sweden, pp. 835-838.

* cited by examiner

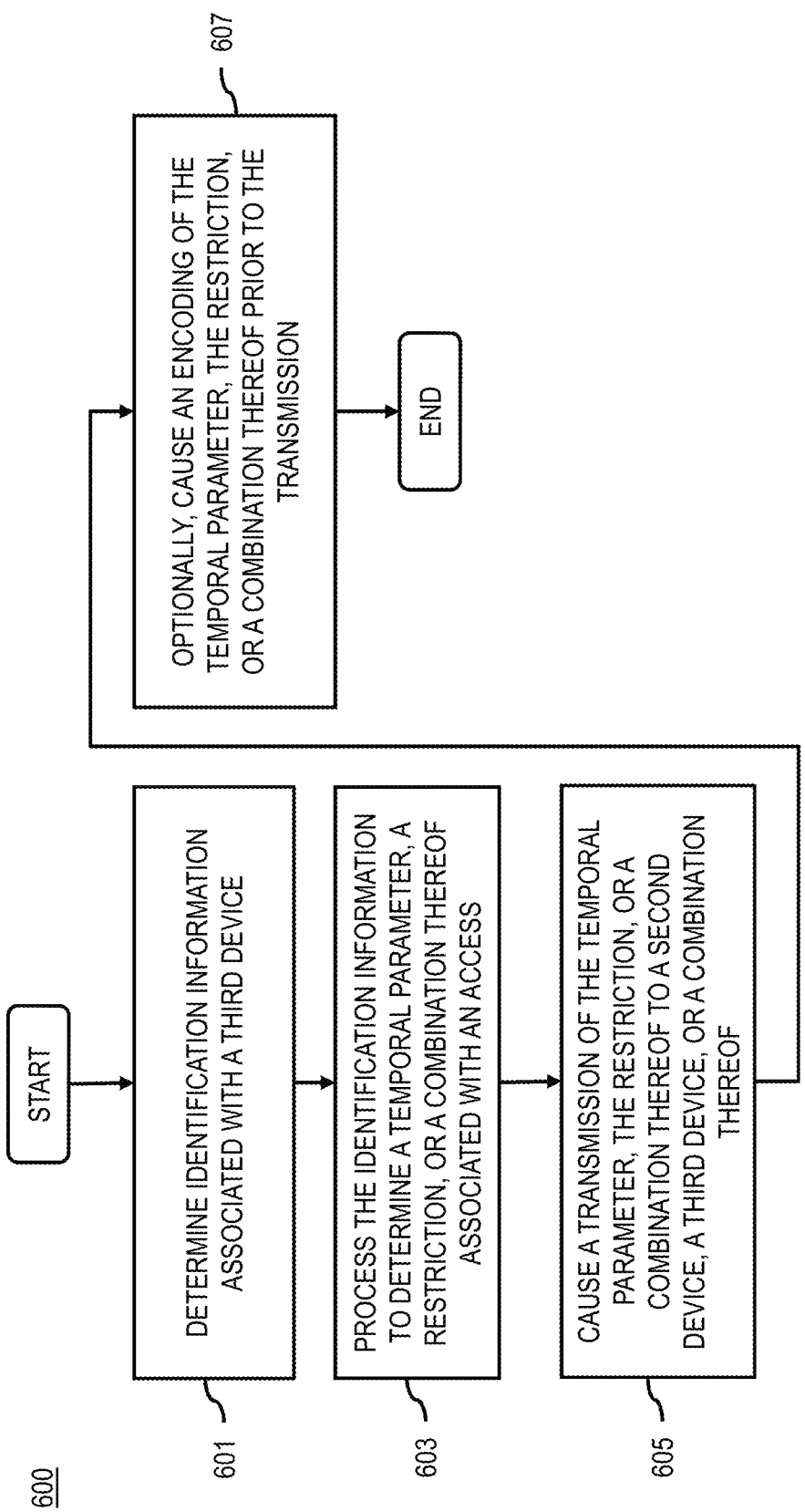

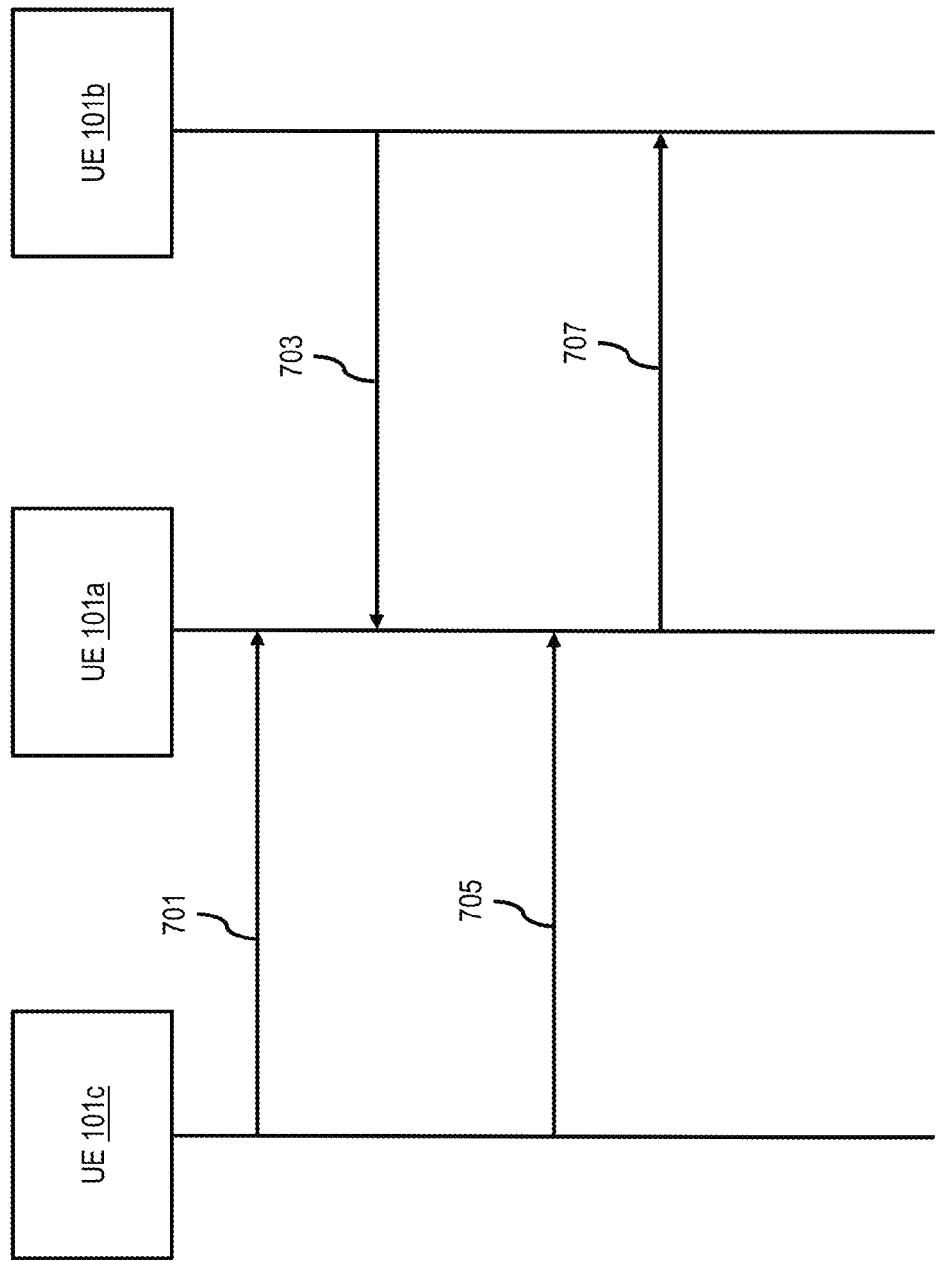

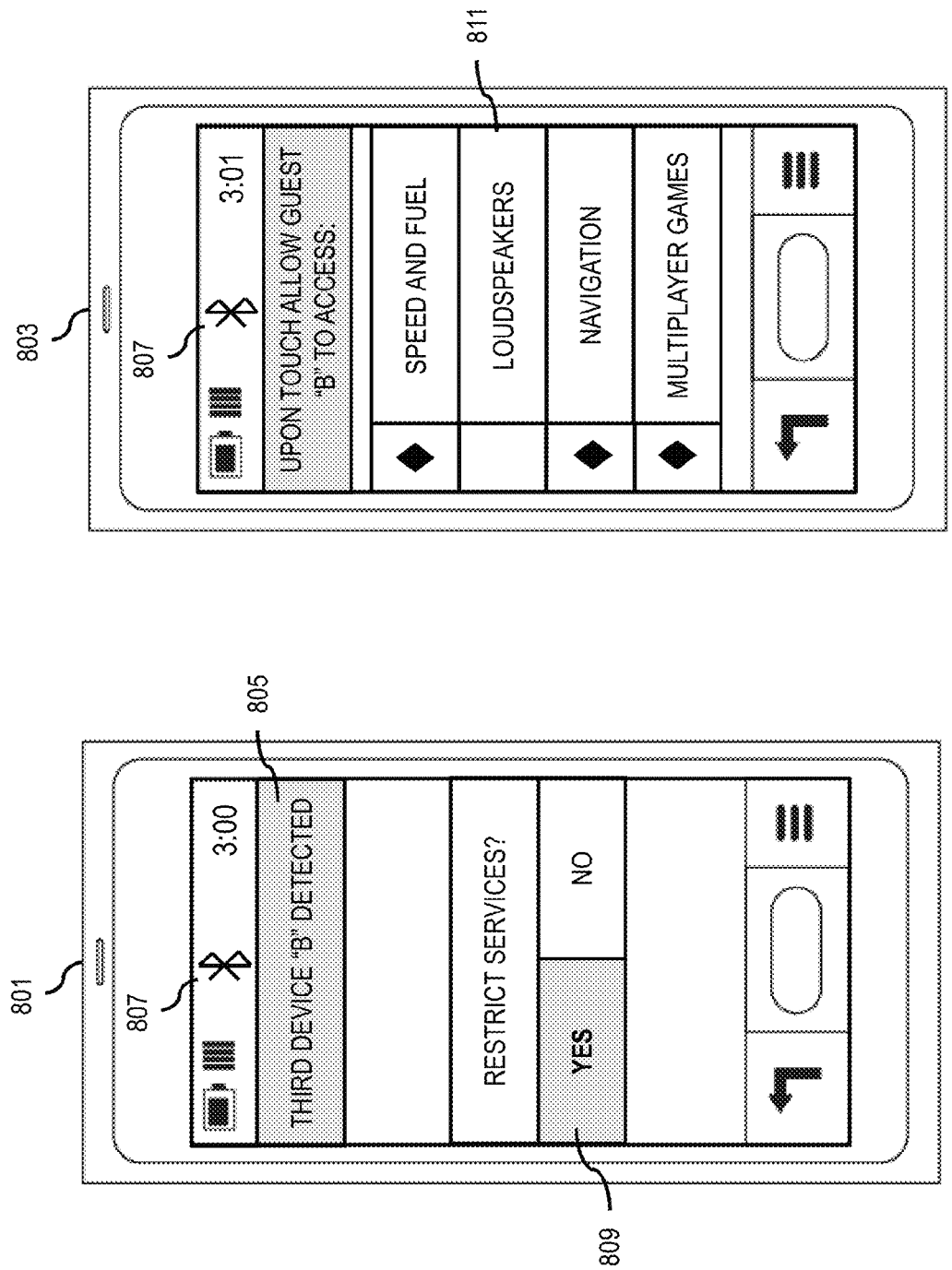

METHOD AND APPARATUS FOR ACCEPTING THIRD-PARTY USE OF SERVICES BASED ON TOUCH SELECTION

BACKGROUND

Service providers and device manufacturers (e.g., wireless, cellular, etc.) are continually challenged to deliver value and convenience to consumers by, for example, providing compelling network services. One area of interest has been the development of interactive resources and services that can be selected and used across multiple mobile devices (e.g., mobile phones and/or tablets) that are within proximity to one another (e.g., near or within an automobile). More specifically, the resources and services are provisioned between the mobile devices based on one or more short-range communication technologies such as Bluetooth® (Bluetooth), Bluetooth LE (BLE), near field communication (NFC), wireless fidelity (WiFi), or combination thereof. By way of example, in the automobile context, the mobile devices may be considered as peripherals and/or an augmentation of the vehicle's resources. For example, once a connection between a device and a vehicle has been established, the device can use the resources associated with the vehicle (e.g., loudspeakers, steering wheel buttons, hands-free or text-to-speech systems, displays, projectors, etc.) and the vehicle may benefit from the resources of the device (e.g., global positioning system (GPS) sensors, Internet connectivity, messaging technologies, etc.). However, introducing and/or sharing resources and services among multiple devices can pose a number of dynamic access and security problems as well as configuration problems for which manual configuration and/or matching of devices is often cumbersome and unintuitive. Accordingly, services providers and device manufacturers face significant technical challenges in providing a service that expeditiously brokers services among the various multiple devices in a secure manner.

SOME EXAMPLE EMBODIMENTS

Therefore, there is a need for an approach for brokering resources and services among multiple devices based on one or more touch-based interactions.

According to one embodiment, a method comprises causing, at least in part, at least one initiation of one or more touch-based interactions with at least one first device, at least one third device, or a combination thereof based, at least in part, on at least one connection request from the at least one first device, the at least one third device, or a combination thereof. The method also comprises determining the one or more touch-based interactions with the at least one first device, the at least one third device, or a combination thereof. The method further comprises causes, at least in part, at least one access to one or more services associated with at least one second device based, at least in part, on the one or more touch-based interactions.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, at least one initiation of one or more touch-based interactions with at least one first device, at least one third device, or a combination thereof based, at least in part, on at least one connection request from the at least one first device, the at least one third device, or a combination thereof. The apparatus is also caused to determine the one or more touch-based interactions with the at least one first device, the at least one third device, or a combination thereof. The apparatus further causes, at least in part, at least one access to one or more services associated with at least one second device based, at least in part, on the one or more touch-based interactions.

According to another embodiment, a computer-readable storage medium carries one or more sequences of one or more instructions which, when executed by one or more processors, cause, at least in part, an apparatus to cause, at least in part, at least one initiation of one or more touch-based interactions with at least one first device, at least one third device, or a combination thereof based, at least in part, on at least one connection request from the at least one first device, the at least one third device, or a combination thereof. The apparatus is also caused to determine the one or more touch-based interactions with the at least one first device, the at least one third device, or a combination thereof. The apparatus further causes, at least in part, at least one access to one or more services associated with at least one second device based, at least in part, on the one or more touch-based interactions.

According to another embodiment, an apparatus comprises means for causing, at least in part, at least one initiation of one or more touch-based interactions with at least one first device, at least one third device, or a combination thereof based, at least in part, on at least one connection request from the at least one first device, the at least one third device, or a combination thereof. The apparatus also comprises means for determining one or more touch-based interactions with the at least one first device, the at least one third device, or a combination thereof. The apparatus further causes, at least in part, at least one access to one or more services associated with at least one second device based, at least in part, on the one or more touch-based interactions.

According to one embodiment, a method comprises causing, at least in part, one or more touch-based interactions with at least one second device, at least one third device, or a combination thereof based, at least in part, on at least one connection request from the at least one second device, the at least one third device, or a combination thereof. The method also comprises determining, at least in part, at least one access for the at least one third device to the at least one second device based, at least in part, on the one or more touch-based interactions.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, one or more touch-based interactions with at least one second device, at least one third device, or a combination thereof based, at least in part, on at least one connection request from the at least one second device, the at least one third device, or a combination thereof. The apparatus also determines, at least in part, at least one access for the at least one third device to the at least one second device based, at least in part, on the one or more touch-based interactions.

According to another embodiment, a computer-readable storage medium carries one or more sequences of one or more instructions which, when executed by one or more processors, cause, at least in part, an apparatus to cause, at least in part, one or more touch-based interactions with at least one second device, at least one third device, or a combination thereof based, at least in part, on at least one connection request from the at least one second device, the at least one third device, or a combination thereof. The apparatus also determines, at least in part, at least one access for the at least one third device to the at least one second device based, at least in part, on the one or more touch-based interactions.

According to another embodiment, an apparatus comprises means for causing, at least in part, one or more touch-based interactions with at least one second device, at least one third device, or a combination thereof based, at least in part, on at least one connection request from the at least one second device, the at least one third device, or a combination thereof. The apparatus also comprises means for determining, at least in part, at least one access for the at least one third device to the at least one second device based, at least in part, on the one or more touch-based interactions.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3-6 are flowcharts of a process for brokering resources and services among multiple devices based on one or more touch-based interactions, according to one embodiment;

FIGS. 7A and 7B are ladder diagrams that illustrate brokering resources and services among multiple devices based on one or more touch-based interactions, according to various embodiments;

FIG. 8 is a diagram of user interfaces utilized in the processes of FIG. 3-6, according to various embodiments;

DESCRIPTION OF SOME EMBODIMENTS

Examples of a method, apparatus, and computer program for brokering resources and services among multiple devices based on one or more touch-based interactions are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the terms "touch," "touching," and "touch-based interactions," are used interchangeably to refer to a method of expediting a wireless configuration (e.g., device discovery and touch-to-select and/or touch-to-be-selected mechanisms) based, at least in part, on proximity (e.g., Received Signal Strength Indication (RSSI) values). More specifically, touching, at least for the purposes of the current disclosure, does not require that multiple devices actually come into physical contact with each other. Rather, holding at least two mobile devices in close proximity to one another (i.e., the RSSI reading of the device reaches a threshold criteria relative to the discovering device) for a short duration of time may be enough to trigger operations (e.g., a grant of access to the one or more services associated with a device). Thereafter, the mobile devices may be separated and utilized within the communication range of whatever wireless communication medium is being utilized in order to support system interaction. Such wireless interaction may be implemented utilizing various types of short-range wireless communication technologies (e.g., Bluetooth, BLE, NFC, WiFi, or a combination thereof). While a multitude of wireless communication mediums are available, the various embodiments of the present invention disclosed herein use Bluetooth for the sake of explanation. In addition, touch-based interactions may work in one of two ways. First, "touch-to-select" refers to the example use case where the device with which the user performs the choice activity (i.e., by touching) has the physical means to perform the selection operation (i.e., sending the inquiry and calculating the RSSI value from the response). Second, "touch-to-be-selected" refers to the example use case where the device with which the user performs the choice activity (i.e., by touching) does not have the physical means to perform the selection operation, but the physical operation is still detected by the device being touched.

Figure 1:
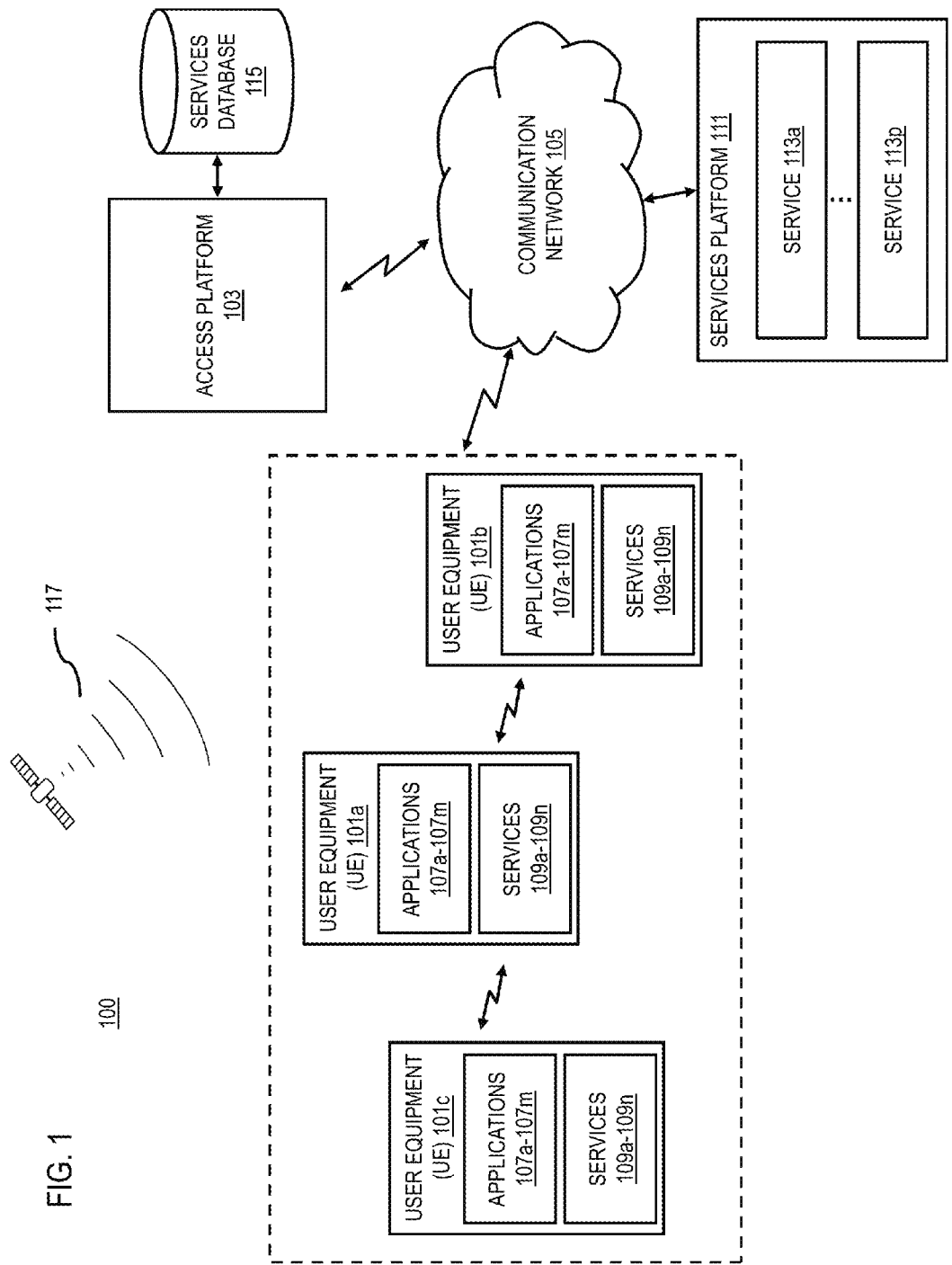
FIG. 1 is a diagram of a system capable of brokering resources and services among multiple devices based on one or more touch-based interactions, according to one embodiment.

FIG. 1 is a diagram of a system capable of brokering resources and services among multiple devices based on one or more touch-based interactions, according to one embodiment. As previously discussed, one area of interest among service providers and device manufacturers has been the development of interactive resources and services that can be selected and used across multiple mobile devices that are within proximity of one another (e.g., near or within an automobile). More specifically, the resources and services are provisioned between the mobile devices based on one or more short-range communication technologies (e.g., Bluetooth). By way of example, in one example use case device "A" is a rental car owned by company "C". A representative of "C" walks with customer "B" to the rental car "A" and unlocks the car for customer "B" using a company device "C" (e.g., a mobile phone or a tablet). In another example use case, customer "B" is within a vehicle "C" and wants to use one or more resources associated with the vehicle. For example, the driver of the vehicle "C" may want to listen to music stored on his or her mobile device as well as control the playback of the music with the steering wheel buttons and at the same time, use the mobile device as an auxiliary display showing driving related information (e.g., average speed). If there are multiple devices in car, they may act as loudspeakers (e.g. via an audio rendering service) providing enhanced audio capabilities.

However, sharing resources and services among multiple devices can pose a number of dynamic access and security problems as well as configuration problems for which manual configuration and/or matching of devices is often cumbersome and unintuitive. More specifically, in one example use case there may be an access and security problem of accepting the use of one or more services associated with a device by another device, which may be previously unknown to the provisioning device. For example, device "A" is owned by another party "C" who needs to give an acceptance or "blessing" to allow guest "B" access to the one or more services associated with device "A". This situation may also arise when device "A" has limited user interface (UI) facilities for key entry. In another example use case, there may be a configuration problem where the owner of a requesting device is in a foreign environment and is uncertain as to which devices and/or services are available for use. By way of example, owner "C" needs to point out to guest "B" the presence of device "A" and/or its services because guest "B" is uncertain which devices and/or services are available in the foreign environment.

To address this problem, a system 100 of FIG. 1 introduces the capability to broker resources and services among multiple devices based on one or more touch-based interactions. As shown in FIG. 1, the system 100 comprises one or more user equipment (UE) 101a-101c (e.g., mobile phones and/or tablets) (also collectively referred to as UEs 101) having connectivity to an access platform 103 via a communication network 105. The UEs 101 also have connectivity to one another via one or more short-range communication technologies (e.g., Bluetooth, BLE, NFC, WiFi, or a combination thereof). The UEs 101 also include or have access to one or more applications 107a-107m (also collectively referred to as applications 107). By way of example, the applications 107 may include mapping and/or navigation applications, media applications, multiplayer games, etc. The UEs 101 further include or have access to one or more services 109a-109n (e.g., mapping and/or navigation services, security related services, gaming services, media services, social networking services, etc.) (also collectively referred to as services 109).

In one embodiment, it is contemplated that the owner of the UE 101c (i.e., the at least one first device) also owns the UE 101a (i.e., the at least one second device), the UE 101a knows that the UE 101c is its "master" (e.g., minimally knowing the UE 101c's Bluetooth address), and the UE 101a (i.e., a "slave") has touch-to-be-selected capability (i.e., it can detect the proximity of a Bluetooth device and obtain its Bluetooth address). Moreover, it is contemplated that the UE 101a is in discoverable mode (e.g., doing inquiry scans at 2.56 s intervals) and that the UE 101b (i.e., a "guest" and/or the at least one third device) minimally has a standard Bluetooth stack. In addition, in one example use case, the UE 101a and the UE 101c have been "paired" so that the UE 101a can connect with the UE 101c. Further, in one embodiment, the system 100 has been simplified to include only one second UE 101 (e.g., UE 101a) and only one third UE 101 (e.g., UE 101b), however, it is contemplated that a plurality of second and third UEs 101 could be connected with at least one first UE 101 (e.g., UE 101c).

The UEs 101 are also connected to a services platform 111 via the communication network 105. The services platform 111 includes one or more services 113a-113p (also collectively referred to as services 113). The services 113 may include a wide variety of services such as content provisioning services for one or more of the applications 107, one or more of the services 109, or a combination thereof. By way of example, like services 109, the services 113 may include mapping and/or navigation services, security related services, gaming services, media services, social networking services, etc.

In one embodiment, the access platform 103 may include or be associated with at least one services database 115. In one example embodiment, the access platform 103 may exist in whole or in part within a UE 101, or independently, and the services database 115 may exist in whole or in part within the access platform 103, or independently. In one embodiment, the services database 115 may include one or more service descriptions obtained from a UE 101 that is touching and/or has recently been touched the services 109, the services 113, or a combination thereof as well as a list of one or more authenticated devices based, at least in part, on the Bluetooth addresses associated with the UEs 101 (e.g., the UE 101a and the UE 101c).

In certain embodiments, the applications 107, the services 109, or a combination thereof may utilize location-based technologies (e.g., GPS, cellular triangulation, Assisted GPS (A-GPS), etc.) to make a request to one or more services 113 for location-based data (e.g., mapping and navigation information, social networking information, etc.) based on a position relative to a UE 101. For example, a UE 101 may include a GPS receiver to obtain geographic coordinates from satellites 117 to determine its current location.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), WiFi, wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

In one embodiment, from the perspective of at least one second device in a master-slave relationship (e.g., the UE 101a), the system 100 determines identification information associated with at least one first device (e.g., the UE 101c). By way of example, in the context of Bluetooth, the identification information may include the Bluetooth address of at least one first device. In one embodiment, the system 100 then processes and/or facilitates a processing of the identification information to verify a master-slave relationship between the at least one first device (e.g., the UE 101c) and at least one second device (e.g., the UE 101a). As previously discussed, in one embodiment, it is contemplated that the at least one second device knows that the at least one first device is its master (e.g., minimally knowing the Bluetooth address of the first device). Moreover, in one embodiment, the system 100 can compare the identification information associated with a device (e.g., a mobile phone or a tablet) against a list of one or more authenticated devices stored in the at least one services database (e.g., the services database 115).

In one or more embodiments, the system 100 causes, at least in part, at least one initiation of one or more touch-based interactions with at least one first device, at least one third device, or a combination thereof based, at least in part, on at least one connection request from the at least one first device (e.g., the UE 101c), the at least one third device (e.g., the UE 101b), or a combination thereof. In particular, the one or more touch-based interactions include, at least in part, one or more touch-to-select, touch-to-be-selected, proximity detection, or a combination thereof mechanisms. By way of example, in an example use case using Bluetooth, the at least one second device (e.g., the UE 101a) is in discoverable mode and is periodically doing inquiry scans (e.g., at 2.56 s intervals) to determine whether there are any "inquiry" (ID) packets originating from at least one first device and the at least one first device (e.g., the UE 101a) is in inquiry mode (e.g., sending ID packets). Further, it is contemplated that the at least one second device (e.g., the UE 101a) may indicate the initiation of the touch-to-be-selected discovery by various means including, at least in part, sound, light, vibration, a user interface (UI) display, or a combination thereof. In another example use case, based, at least in part, on the connection request of at least one third device (e.g., the UE 101b), at least one second device (e.g., the UE 101a) initiates touch-to-select discovery of both the at least one first device (e.g., the UE 101c) and the at least one third device. In particular, this example use case requires the proximity of both the at least one first device and the at least one third device and the at least one first device (e.g., the UE 101c) can verify by sight the at least one third device (e.g., the UE 101b).

In one embodiment, the system 100 causes, at least in part, at least one initiation of at least one timer associated with the one or more touch-based interactions. More specifically, in one embodiment, when the system 100 determines a connection request from at least one third device (e.g., the UE 101b), for example, the system 100 can start a timer based, at least in part, on at least one second device's corresponding initiation of a touch-to-be-selected discovery of the at least one first device and therefore an expectation of a forthcoming touch from the at least one first device (e.g., the UE 101c). In this example use case, if the system 100 determines that the timer has expired before the at least one first device touches the at least one second device, then the system 100 will deny the connection request of the at least one third device.

In one or more embodiments, the system 100 determines the one or more touch-based interactions between the at least one second device and the at least one first device, the at least one third device, or a combination thereof. For example, if the at least one second device (e.g., the UE 101a) determines an ID packet, the at least one second device can respond by sending frequency hopping synchronization (FHS) packets. In addition, the at least one second device may send an Extended Inquiry Response (EIR) after sending the FHS packets to deliver more information about itself (e.g., the device name, transmission (Tx) power, and information about supported service classes). In one embodiment, if at least two UEs 101 (e.g., the UE 101a and the UE 101c) are able to exchange ID, EIR, and FHS packets, respectively, then the system 100 determines that the UEs 101 are relatively close to one another (e.g., within a range of approximately 100 m). Further, when the discovering device (e.g., the UE 101*c*) receives the inquiry response, it defines the RSSI value from the FHS. In particular, the signal strength of the device is heavily attenuated when the signal leaves the antenna. The signal strength difference of devices a few centimeters apart compared to devices 50 centimeters apart can be several tens of decibels. This property of signal attenuation makes it possible to filter out devices based on their RSSI readings and therefore determine the proximity information of the UEs 101 relative to one another. Moreover, the RSSI reading of a device can be followed and once it reaches a threshold criteria (e.g., in touching range), the discoverable device (e.g., the UE 101*a*) can be selected.

In one embodiment, the system 100 determines one or more temporal parameters, one or more restrictions, or a combination thereof associated with the at least one access from the at least one first device, wherein the one or more temporal parameters, the one or more restrictions, or a combination thereof are based, at least in part, on one or more quantity values, one or more duration values, one or more preference values (e.g., one or more blacklists or one or more whitelists), or a combination thereof. In one embodiment, the system 100 can cause, at least in part, at least one first device (e.g., the UE 101*c*) to transmit information to at least one second device (e.g., the UE 101*a*) regarding the duration of the at least one access and the duration may include a specific number of times (e.g., this time only, the next 10 connections, etc.) or a time of validity (e.g., 24 hours). Further, when the system 100 determines that the duration is valid, the system 100 can cause, at least in part, the at least one second device (e.g., the UE 101*a*) to allow connections with at least one third device (e.g., the UE 101*b*) without repeatedly requiring permission from the at least one first device (e.g., the UE 101*c*).

In one or more embodiments, the system 100 causes, at least in part, at least one access to one or more services associated with the at least one second device (e.g., the UE 101*a*) based, at least in part, on the one or more touch-based interactions. For example, the one or more services may be directly provided by the at least one second device or the one or more services may be accessed through the at least one second device (e.g., one or more cloud-based services). In one embodiment, it is contemplated that the system 100 requires the at least one first device (e.g., the UE 101*c*) to touch the at least one second device (e.g., the UE 101*a*) to accept the connection request of the at least one third device (e.g., the UE 101*b*) (i.e., "bless" the connection) before the system 100 will grant the at least one third device at least one access to the one or more services associated with the at least one second device (e.g., mapping and/or navigation services, media services, multiplayer gaming services, etc.). In another example use case, when the system 100 determines the proximity of at least one third device (e.g., the UE 101*b*) to at least one second device (e.g., the UE 101*a*) and the proximity of at least one first device (e.g., the UE 101*c*) to the at least one second device, all by touching, the system 100 can grant the at least one third device at least one access to the one or more services associated with the at least one second device (e.g., mapping and/or navigation services).

In one embodiment, from the perspective of the at least one first device in a master-slave relationship (e.g., the UE 101*c*), the system 100 determines identification information associated with at least one third device. For example, the identification information may include, at least in part, the Bluetooth address of the at least one third device (e.g., the UE 101*b*), which the at least one third device has communicated to at least one first device (e.g., the UE 101*c*) and/or at least one second device (e.g., the UE 101*a*). In one embodiment, it is contemplated that the communication may be initiated by either the at least one first device or the at least one second device.

In one or more embodiments, the system 100 then processes and/or facilitates a processing of the identification information to determine one or more temporal parameters, one or more restrictions (e.g., one or more blacklists), or a combination thereof associated with the at least one access. As previously discussed, the one or more temporal parameters, the one or more restrictions, or a combination thereof are based, at least in part, on one or more quantity values, one or more duration values, one or more preference values, or a combination thereof. For example, in the automobile context, the system 100 may determine to allow at least one third device (e.g., the UE 101*b*) access to mapping and/or navigation services associated with a vehicle (i.e., the at least one second device), but not the vehicle's loudspeakers. In another example use case, again in the automobile context, the system 100 may allow a user to blacklist one or more third devices associated with a child to prevent the child from having access to the controls of the loudspeakers. Likewise, the system 100 may determine to whitelist one or more third devices (e.g., a mobile phone and/or a tablet) associated with the spouse of the owner of the at least one first device so that when he or she is driving the vehicle, he or she has the same access as the owner of the at least one first device. In one embodiment, the system 100 then causes, at least in part, at least on modification of the at least one access based, at least in part, on the one or more blacklists, the one or more whitelists, or a combination thereof. Moreover, the system 100 may modify the at least one access remotely without touching, however, this runs the risk of blacklisting or whitelisting a device by mistake.

In one or more embodiments, the system 100 causes, at least in part, at least one transmission of the one or more temporal parameters, the one or more restrictions, or a combination thereof to at least one second device, wherein the at least one access is further based, at least in part, on the one or more temporal parameters, the one or more restrictions, or a combination thereof. Essentially, at least one first device (e.g., the UE 101*c*) informs at least one second device (e.g., the UE 101*a*) about the upcoming access by at least one third device (e.g., the UE 101*b*) and the one or more rights the at least one third device has with respect to the at least one second device. Further, in one example use case, the system 100 can cause, at least in part, at least one first device (e.g., the UE 101*c*) to publish information about types or even instances of services associated with at least second device (e.g., the UE 101*a*) that the system 100 will permit the second device to share and to whom it can share with (e.g., at least one third device) and this can be negotiated between the at least one first device and the at least one second device during the touch-to-select discovery initiated by the at least one second device.

In one embodiment, the system 100 can cause, at least in part, at least one first device (e.g., the UE 101*c*) to encode and embed the service information using 128-bit encryption so that the information will only be visible to a device doing inquiry (e.g., the UE 101*a*) and this does not require a Bluetooth connection. Moreover, in one example use case, the encoded information may include the 48-bit Bluetooth ID of at least one second device (e.g., the UE 101*a*), one or more encoded commands (e.g., "deny," "allow," etc.), one or more standard Bluetooth 16-bit service classes, one or more Bluetooth IDs of potential third devices (e.g., the UE 101*b*) associated with one or more blacklists or one or more whitelists, an encoded negative response, or a combination thereof. In one embodiment, the system 100 then causes, at least in part, the transmission of the information regarding the one or more services based, at least in part, on the encoded information.

In one embodiment, the system 100 causes, at least in part, one or more touch-based interactions with at least one second device (e.g., the UE 101a), at least one third device (e.g., the UE 101b), or a combination thereof based, at least in part, on at least one connection request from the at least one second device, the at least one third device, or a combination thereof. More specifically, the system 100 causes, at least in part, at least one first device (e.g., the UE 101c) to transmit one or more ID packets, which are then determined by either the at least one second device (e.g., the UE 101a) or the at least one third device (e.g., the UE 101b). The at least one second device, for example, can then respond by sending FHS packets. Thereafter, the discovering device (e.g., the UE 101c) defines the RSSI value from the FHS packets. As previously discussed, the signal strength of the device is heavily attenuated when the signal leaves the antenna and this property of signal attenuation makes it possible to filter out devices based on their RSSI readings and therefore determine the proximity information associated with that device (e.g., a mobile phone). Moreover, the RSSI reading of a device can be followed and once it reaches a threshold criteria (e.g., in touching range), the discoverable device (e.g., the UE 101a) can be selected (i.e., touch-to-be-selected). In one embodiment, the system 100 then determines, at least in part, at least one access for the at least one third device (e.g., the UE 101b) to the at least one second device based, at least in part, on the one or more touch-based interactions. In particular, by touching at least one second device (e.g., the UE 101a) or at least one third device (e.g., the UE 101b), at least one first device (e.g., the UE 101c) accepts or "blesses" the connection between the at least one third device and the at least one second device. In another example use case, when the system 100 determines the proximity of at least one third device (e.g., the UE 101b) to at least one second device (e.g., the UE 101a) and the proximity of at least one first device (e.g., the UE 101c) to the at least one second device, all by touching, the system 100 grants the at least one third device at least one access to the one or more services associated with the at least one second device (e.g., mapping and/or navigation services, media services, multiplayer gaming services, etc.).

By way of example, the UEs 101, the applications 107, the services 109, the services platform 111, the services 113, and the satellites 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
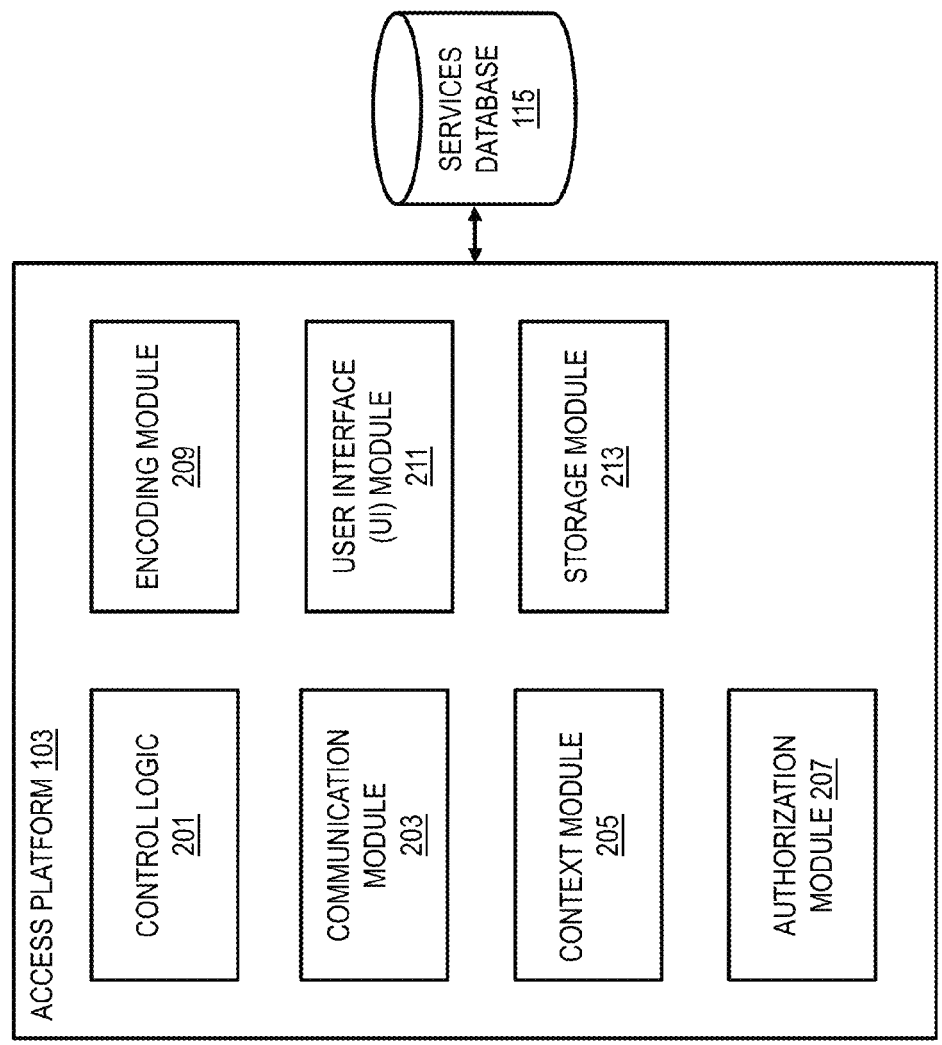
FIG. 2 is a diagram of the components of an access platform, according to one embodiment.

FIG. 2 is a diagram of the components of an access platform 103, according to one embodiment. By way of example, the access platform 103 includes one or more components for brokering resources and services among multiple devices based on one or more touch-based interactions. It is contemplated that the functions of these components may be combined in one or more components or performed by other components of equivalent functionality. In this embodiment, the access platform 103 includes a control logic 201, a communication module 203, a context module 205, an authorization module 207, an encoding module 209, a user interface (UI) module 211, and a storage module 213.

In one embodiment, the control logic 201 oversees tasks, including tasks performed by the communication module 203, the context module 205, the authorization module 207, the encoding module 209, the UI module 211, and the storage module 213. For example, although the other modules may perform the actual task, the control logic 201 may determine when and how those tasks are performed or otherwise direct the other modules to perform the task. In one embodiment, the control logic 201 may also cause, at least in part, at least one initiation of at least one timer associated with one or more touch-based interactions (e.g., touch-to-select discovery of at least one first device). For example, the control logic 201 causes, at least in part, at least one second device (e.g., the UE 101a) to start a timer to expect the touch from at least one first device (e.g., the UE 101c) and if the timer expires, the connection request of the at least one third device (e.g., the UE 101b) is denied. The control logic 201, in connection with the communication module 203, may also be used to cause, at least in part, at least one transmission of the one or more temporal parameters, the one or more restrictions, or a combination thereof to at least one second device (e.g., based on at least one connection request from at least one third device).

The communication module 203 in certain embodiments is used for communication between the UEs 101, the access platform 103, the applications 107, the services 109, the services platform 111, the services 113, the services database 115, and the satellites 117. The communication module 203 may be used to communicate commands, requests, data, etc. The communication module 203 also may be used to facilitate one or more short-range wireless communications among the UEs 101 including, at least in part, Bluetooth, BLE, NFC, WiFi, or a combination thereof. For example, the communication module 203 in an example use case using Bluetooth, may be used to enable inquiry (e.g., sending ID packets) and/or to define the contents of one or more EIR packets.

More specifically, in one embodiment, the communication module 203 is used to determine identification information (e.g., a Bluetooth address) associated with at least one first device (e.g., the UE 101c). The communication module 203 may also be used to cause, at least in part, at least one initiation of one or more touch-based interactions (e.g., touch-to-be-selected) of at least one first device, at least one third device, or a combination thereof based, at least in part, on at least one connection request from the at least one first device, the at least one third device, or a combination thereof. The communication module 203 may be used to determine identification information associated with at least one third device (e.g., a Bluetooth ID, the content of one or more EIR packets, etc.). Further, the communication module 203 may be used to cause, at least in part, one or more touch-based interactions with at least one second device (e.g., the UE 101a), at least one third device (e.g., the UE 101b), or a combination thereof based, at least in part, on at least one connection request from the at least one second device, the at least one third device, or a combination thereof. By way of example, if the communication module 203 determines that the RSSI reading of at least one first device has reached a threshold criteria (e.g., in touch range), the discoverable device (e.g., the at least one second device) can be selected (i.e., touch-to-be-selected).

In one embodiment, the context module 205 is used to determine the one or more touch-based interactions with at least one first device, at least one third device, or a combination thereof. By way of example, the context module 205 may determine the one or more touch interactions based, at least in part, on one or more RSSI values. The context module 205 also may be used to determine one or more temporal parameters, one or more restrictions, or a combination thereof associated with the at least one access from at least one first device (e.g., the UE 101c). For example, the context module 205 may be used to time the expected touch of at least one first device (e.g., the UE 101c) to at least one second device (e.g., the UE 101a) and if the time expires beforehand, the authorization module 207 can deny a connection request from the at least one third device, for example.

The authorization module 207 in certain embodiments is used to process and/or facilitate a processing of the identification information to verify a master-slave relationship between at least one first device (e.g., the UE 101c) and the at least one second device (e.g., the UE 101a). By way of example, the authorization module 207 can compare the identification information associated with a device (e.g., a mobile phone or a tablet) against a list of one or more authenticated devices stored in the at least one services database 115. The authorization module 207 may also be used to process and/or facilitate a processing of the identification information (e.g., the Bluetooth address of the at least one third device) to determine one or more temporal parameters, one or more restrictions, or a combination thereof associated with the at least one access. The authorization module 207 also may be used to cause, at least in part, at least one access to one or more services associated with at least one second device based, at least in part, on the one or more touch-based interactions. By way of example, in one example use case, the authorization module 207 may determine the at least one access based, at least in part, on whether at least one first device (e.g., the UE 101c) timely touches at least one second device (e.g., the UE 101a) and therefore "blesses" the connection between the at least one second device and at least one third device (e.g., the UE 101b). Further, the authorization module 207 may be used to determine, at least in part, at least one access for the at least one third device to the at least one second device based, at least in part, on the one or more touch-based interactions.

The encoding module 209 in certain embodiments is used to process and/or facilitate a processing of the information regarding the one or more services to encode the information. By way of example, the encoding module 209 can encode and embed this information based, at least in part, on 128-bit encryption and can encode commands (e.g., "deny," "access," etc.) as well as a negative response. In one embodiment, the UI module 211 is used in connection with the communication module 203 to cause, at least in part, a transmission of a notification between at least one first device (e.g., the UE 101c) and at least one second device (e.g., the UE 101a) based, at least in part, on a restriction of access to one or more services. By way of example, the at least one first device may inform the at least one second device (e.g., the UE 101a) about at least one third device (e.g., the UE 101b) and its rights to use the at least one second device and it is contemplated that the UI module 211 can determine what type of notification this can be. In one embodiment, the storage module 213 is used to manage the storage of one or more services descriptions stored in the services database 115 as well as a list of one or more authenticated devices.

Figure 3:
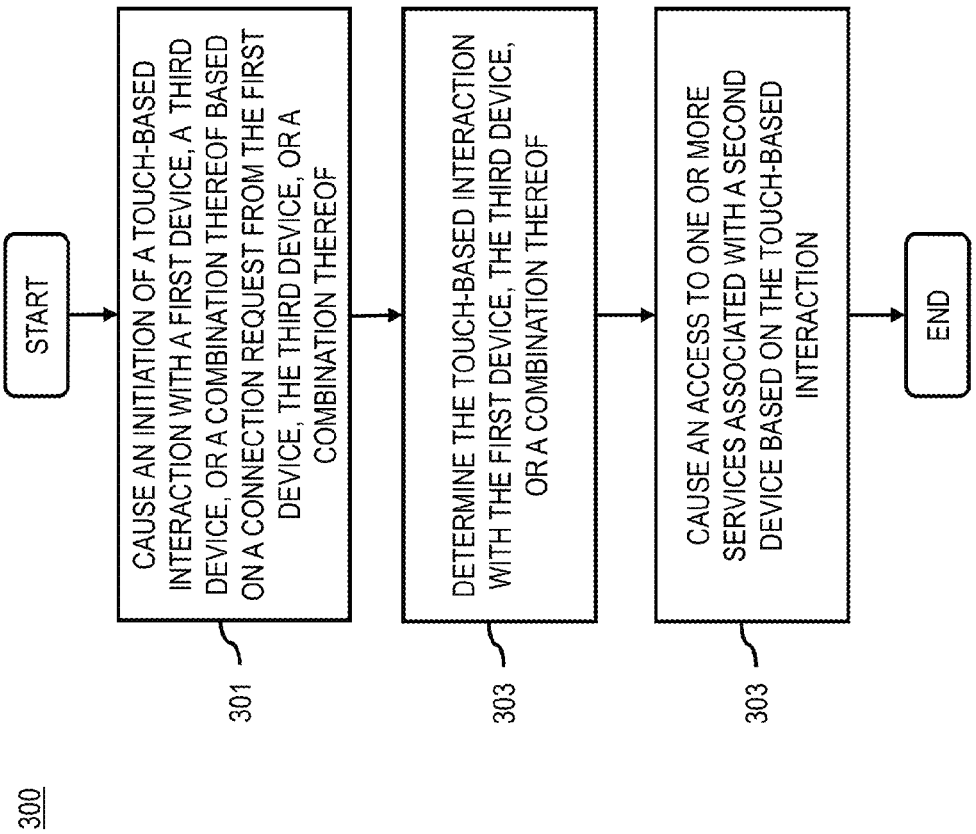
Figure 10:
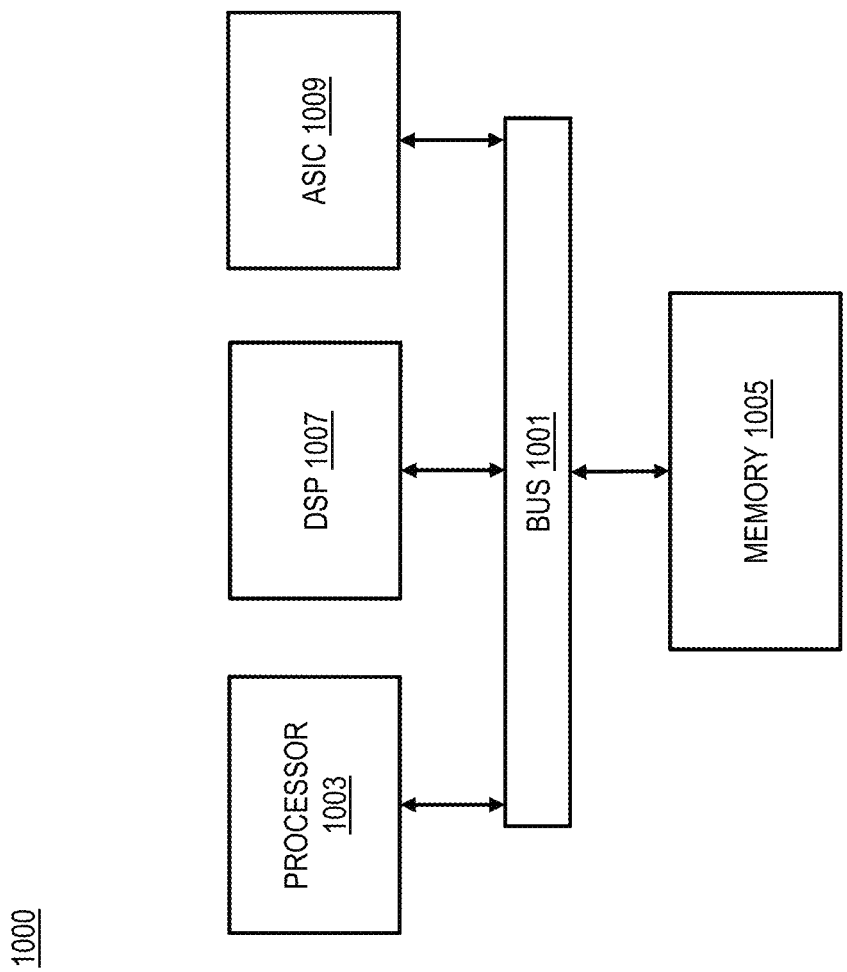
FIG. 10 is a diagram of a chip set that can be used to implement an embodiment of the invention.

FIGS. 3-6 are flowcharts of processes for brokering resources and services among multiple devices based on one or more touch-based interactions, according to one embodiment. More specifically, FIG. 3 depicts the processes from the perspective of at least one second device in a master-slave relationship (i.e., the slave device). In one embodiment, the access platform 103 performs the process 300 and is implemented in, for instance, a chip set including a processor and a memory as shown in FIG. 10. In step 301, the access platform 103 causes, at least in part, at least one initiation of one or more touch-based interactions with at least one first device, at least one third device, or a combination thereof based, at least in part, on at least one connection request from the at least one first device, the at least one third device, or a combination thereof. In particular, the one or more touch-based interactions include, at least in part, one or more touch-to-select, touch-to-be-selected, proximity detection, or a combination thereof mechanisms. By way of example, in an example use case using Bluetooth, the at least one second device (e.g., the UE 101a) is in discoverable mode and is periodically doing inquiry scans to determine whether there are any ID packets originating from at least one first device (e.g., the UE 101c) in inquiry mode.

In step 303, the access platform 103 determines the one or more touch-based interactions with the at least one first device, the at least one third device, or a combination thereof. In one embodiment, once at least one second device (e.g., the UE 101a) determines an ID packet from at least one first device (e.g., the UE 101c), it can respond by sending one or more FHS packets. Then, when the discovering device (e.g., the UE 101c) receives the inquiry response, it can define the RSSI value from the FHS packet of the received response and deliver this together with other inquiry results information to the host level. Further, the RSSI reading of a device can be followed and once it reaches a threshold criteria (e.g., in touching range), the discoverable device (e.g., the UE 101a) can be selected (i.e., touch-to-be-selected).

In step 305, the access platform 103 causes, at least in part, at least one access to one or more services associated with at least one second device based, at least in part, on the one or more touch-based interactions. By way of example, the one or more services may be directly provided by the at least one second device or the one or more services may be accessed through the at least one second device (e.g., one or more cloud-based services). In one example use case, it is contemplated that the access platform 103 requires at least one first device (e.g., the UE 101c) to touch at least one second device (e.g., the UE 101a) to accept the connection request of at least one third device (e.g., the UE 101b) (i.e., "bless" the connection) before the access platform 103 will grant the at least one third device at least one access to the one or more services associated with the at least one second device (e.g., mapping and/or navigation services, media services, multiplayer gaming services, etc.). In another example use case, when the access platform 103 determines the proximity of at least one third device (e.g., the UE 101b) to at least one second device (e.g., the UE 101a) and the proximity of at least one first device (e.g., the UE 101c) to the at least one second device, all by touching, the access platform 103 grants the at least one third device at least one access to the one or more services associated with the at least one second device (e.g., mapping and/or navigation services).

Figure 4:
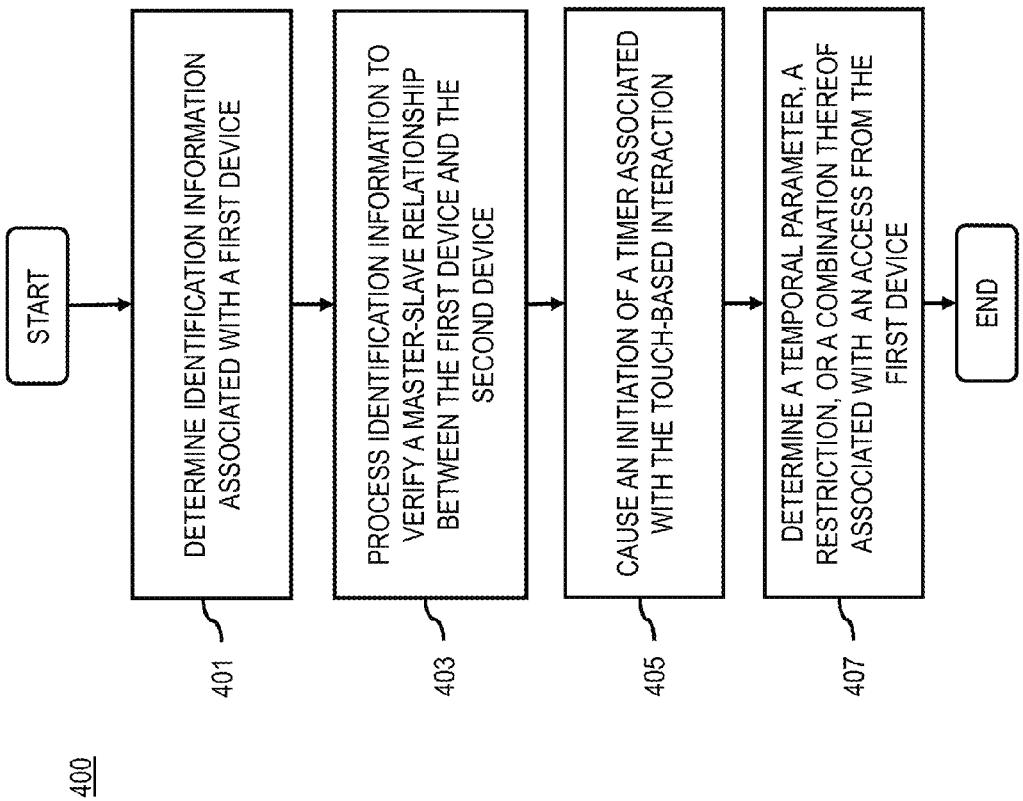

FIG. 4 depicts a process 400 of determining identification information and/or modifying at least one access to one or more services associated with at least one second device from the perspective of at least one second device within a master-slave relationship, according to one embodiment. In one embodiment, the access platform 103 performs the process 300 and is implemented in, for instance, a chip set including a processor and a memory as shown in FIG. 10. In step 401, the access platform 103 determines identification information associated with the at least one first device. By way of example, in the context of Bluetooth, the identification information may include the Bluetooth address of at least one first device (e.g., the UE 101c). Then in step 403, the access platform 103 processes and/or facilitates a processing of the identification information to verify a master-slave relationship between the at least one first device and the at least one second device. In one embodiment, it is contemplated that the access platform 103 can compare the identification information associated with a device (e.g., a mobile phone or a tablet) against a list of one or more authenticated devices stored in at least one services database (e.g., the services database 115).

In step 405, the access platform 103 causes, at least in part, at least one initiation of at least one timer associated with the one or more touch-based interactions, wherein the at least one access is denied if the at least one timer expires before determining the one or more touch-based interactions. By way of example, in one embodiment, when the access platform 103 determines a connection request from at least one first device (e.g., the UE 101a), at least one third device (e.g., the UE 101b), or a combination thereof the access platform 103 can start a timer based, at least in part, on at least one second device's corresponding initiation of a touch-to-be-selected discovery of the at least one first device and therefore an expectation of a forthcoming touch from the at least one first device (e.g., the UE 101c). In this example use case, if the access platform 103 determines that the timer has expired before the at least one first device touches the at least one second device (e.g., the UE 101a), then the system 100 will deny the connection request of the at least one first device (e.g., the UE 101a), the at least one third device (e.g., the UE 101b), or a combination thereof.

In step 407, the access platform 103 determines one or more temporal parameters, one or more restrictions, or a combination thereof associated with the at least one access from the at least one first device, wherein the one or more temporal parameters, the one or more restrictions, or a combination thereof include, at least in part, one or more quantity values, one or more duration values, one or more preference values (e.g., one or more blacklists and/or one or more white lists), or a combination thereof. By way of example, in one embodiment, the access platform 103 can cause, at least in part, at least one first device (e.g., the UE 101c) to transmit information to at least one second device (e.g., the UE 101a) about the duration of the at least one access and the duration may include a specific number (e.g., this time only, the next 10 connections, etc.) or a time of validity (e.g., 24 hours). In addition, when the access platform 103 determines that the duration is valid, the access platform 103 can cause, at least in part, at least one second device (e.g., the UE 101a) to allow connections with at least one third device (e.g., the UE 101b) without repeatedly requiring permission from the at least one first device (e.g., the UE 101c).

Figure 5:
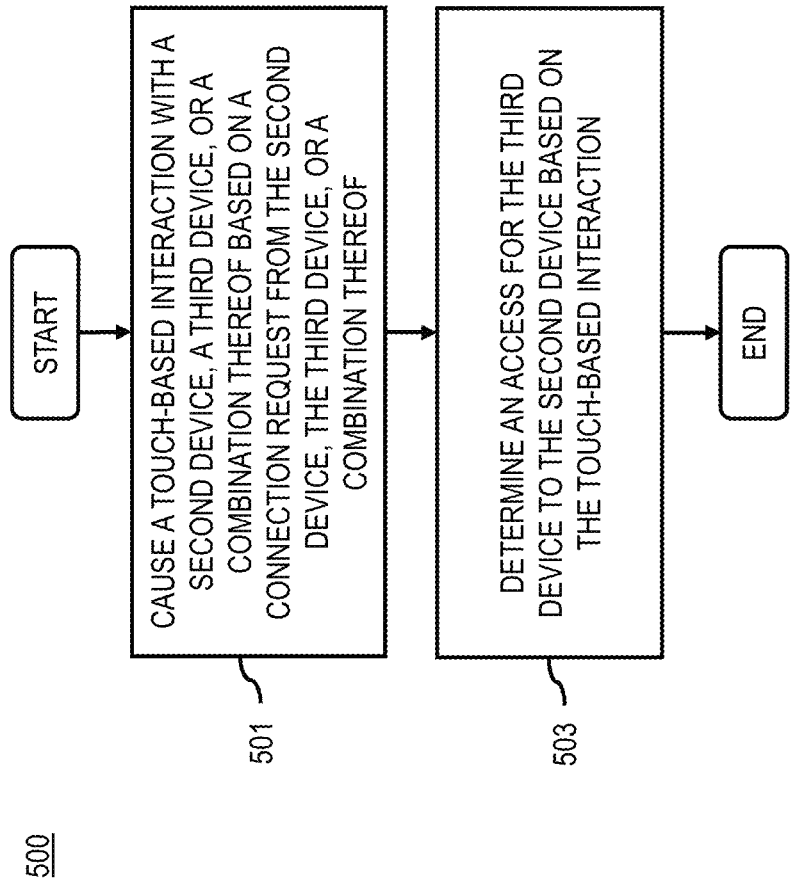

FIG. 5 depicts a process 500 for brokering resources and services among multiple devices based on one or more touch-based interactions from the perspective of at least one first device within a master-slave relationship (i.e., the master device), according to one embodiment. In one embodiment, the access platform 103 performs the process 500 and is implemented in, for instance, a chip set including a processor and a memory as shown in FIG. 10. In step 501, the access platform 103 causes, at least in part, one or more touch-based interactions with at least one second device, at least one third device, or a combination thereof based, at least in part, on at least one connection request from the at least one second device, the at least one third device, or a combination thereof. By way of example, in one example use case where the at least one third device does not know which device to touch/use to take advantage of one or more available services (e.g., while the at least one third device is in a foreign environment), the at least one third device may transmit a connection request. In response, at least one first device (e.g., the UE 101c) may utilize the touch-to-select mechanism to minimally obtain the Bluetooth address of the at least one third device (e.g., the UE 101b) by touching it. More specifically, in one example use case, the access platform 103 causes, at least in part, at least one first device (e.g., the UE 101c) to transmit one or more ID packets, which are then determined by at least one second device (e.g., the UE 101a) or at least one third device (e.g., the UE 101b). The at least one second device, for example, can then respond by sending FHS packets. Thereafter, the discovering device (e.g., the UE 101c) defines the RSSI value from the FHS packets. As previously discussed, the signal strength of the device is heavily attenuated when the signal leaves the antenna and this property of signal attenuation makes it possible to filter out devices based on their RSSI readings and therefore determine the proximity information associated with that device (e.g., a mobile phone). Moreover, the RSSI reading of a device can be followed and once it reaches a threshold criteria (e.g., in touching range), the discoverable device (e.g., the UE 101a) can be selected (i.e., touch-to-select). In this way, touching the wanted device (e.g., the UE 101a), the device can be selected and one or more services provided by the device (e.g., mapping and/or navigation services) can be taken into use without any other device search and selection mechanism.

In step 503, the access platform 103 determines, at least in part, at least one access for the at least one third device to the at least one second device based, at least in part, on the one or more touch-based interactions. By way of example, by touching at least one second device (e.g., the UE 101*a*) or at least one third device (e.g., the UE 101*b*), at least one first device (e.g., the UE 101*c*) accepts or "blesses" the connection between the at least one third device and the at least one second device. In another example use case, when the access platform 103 determines the proximity of at least one third device (e.g., the UE 101*b*) to at least one second device (e.g., the UE 101*a*) and the proximity of at least one first device (e.g., the UE 101*c*) to the at least one second device, all by touching, the access platform 103 can grant the at least one third device at least one access to the one or more services associated with the at least one second device (e.g., mapping and/or navigation services, media services, multiplayer gaming services, etc.).

FIG. 6 depicts a process 600 for determining and/or transmitting identification information related to at least one second device, at least one third device, or a combination thereof from the perspective of at least one first device in a master-slave relationship, according to one embodiment. In one embodiment, the access platform 103 performs the process 600 and is implemented in, for instance, a chip set including a processor and a memory as shown in FIG. 10. In step 601, the access platform 103 determines identification information associated with the at least one third device. By way of example, the identification information in the context of Bluetooth, may include, at least in part, the Bluetooth address of at least one third device (e.g., the UE 101*b*), which the at least one third device has communicated to at least one first device (e.g., the UE 101*c*) and/or at least one second device (e.g., the UE 101*a*). In one embodiment, it is contemplated that the communication may be initiated by either the at least one first device or the at least one second device. Then in step 603, the access platform 103 processes and/or facilitates a processing of the identification information to determine one or more temporal parameters, one or more restrictions, or a combination thereof associated with the at least one access. By way of example, in the automobile context, the access platform 103 may determine to allow at least one third device (e.g., the UE 101*b*) access to mapping and/or navigation services associated with the vehicle (i.e., the at least one second device), but not the vehicle's loudspeakers. In another example use case, the access platform 103 may allow a user to blacklist one or more third devices (e.g., the UE 101*b*) associated with a child to prevent the child form having access to the controls of the loudspeakers. Likewise, the access platform 103 may determine to whitelist one or more third devices (e.g., a mobile phone or a tablet) associated with the spouse of the owner of at least one first device (e.g., the UE 101*c*) so that when he or she is driving the vehicle, he or she has the same access as the owner of the at least one first device.

In step 605, the access platform 103 causes, at least in part, at least one transmission of the one or more temporal parameters, the one or more restrictions, or a combination thereof to the at least one second device, wherein the at least one access is further based, at least in part, on the one or more temporal parameters, the one or more restrictions, or a combination thereof. In one embodiment, it is contemplated that at least one first device (e.g., the UE 101*c*) essentially informs at least one second device (e.g., the UE 101*a*) about the upcoming access by at least one third device (e.g., the UE 101*b*) and the one or more rights the at least one third device has to use the at least one second device. Further, in one example use case, the access platform 103 can cause, at least in part, at least one first device (e.g., the UE 101*c*) to publish information about types or even instances of services associated with at least one second device (e.g., the UE 101*a*) that the access platform 103 will permit the at least one second device to share and to whom it can share with (e.g., at least one third device) and this can be negotiated between the at least one first device and the at least one second device during the touch-to-select discovery initiated by the at least one second device.

In step 607, the access platform 103 can cause, at least in part, an encoding of the one or more temporal parameters, the one or more restrictions, or a combination thereof prior to the at least one transmission. For example, the access platform 103 can cause, at least in part, at least one first device (e.g., the UE 101*c*) to encode and embed the service information using 128-bit encryption so that the information will only be visible to a device doing inquiry (e.g., the UE 101*a*) and this does not require a Bluetooth connection. In addition, in one example use case, the encoded information may include the 48-bit Bluetooth ID of at least one second device (e.g., the UE 101*a*), one or more encoded commands, one or more standard Bluetooth 16-bit service classes, one or more Bluetooth IDs of potential thirds associated with one or more blacklists or one or more whitelists, an encoded response, or a combination thereof.

Figure 7B:
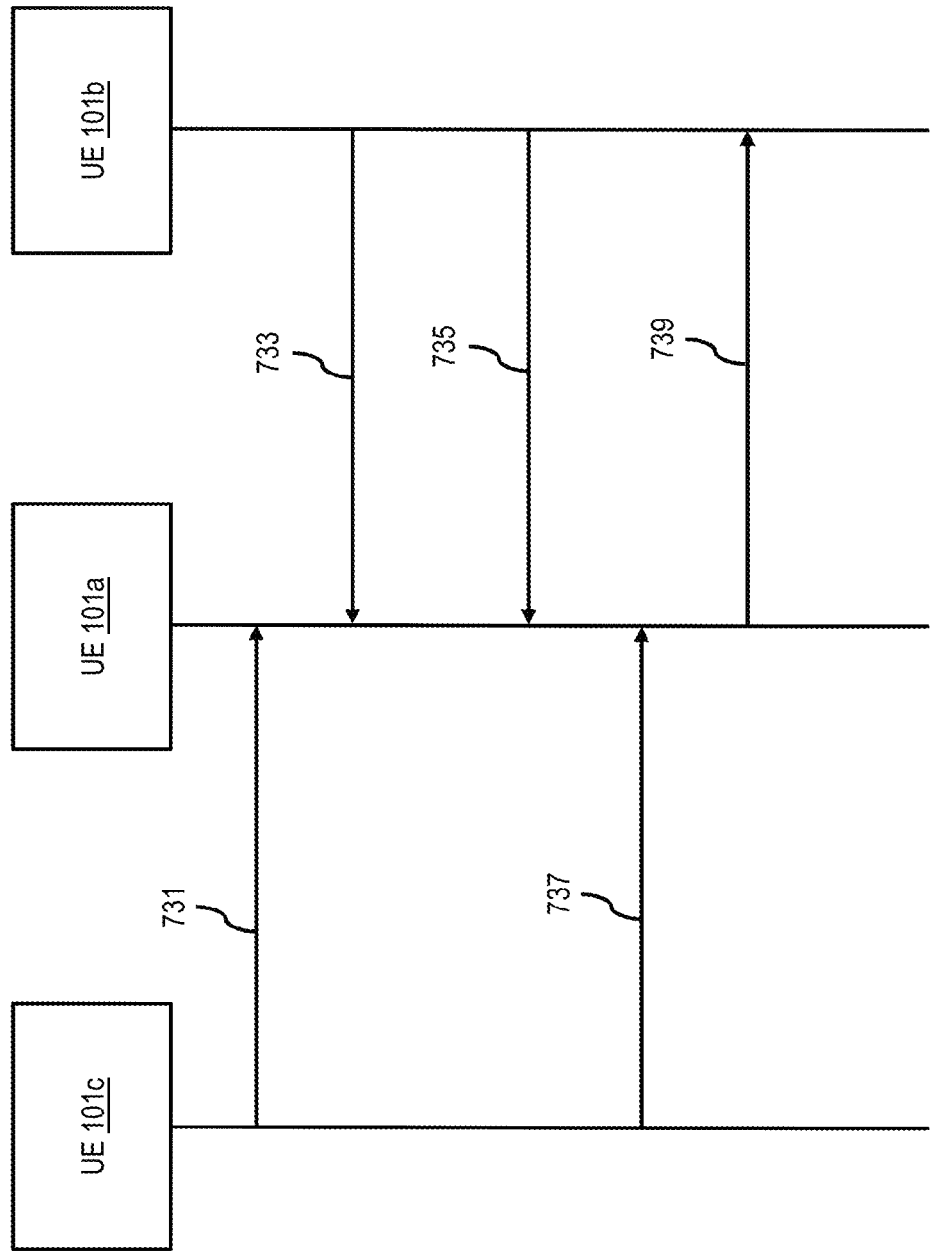

FIGS. 7A and 7B are ladder diagrams that illustrate brokering resources and services among multiple devices based on one or more touch-based interactions, according to one embodiment. FIG. 7A depicts a basic acceptance of a connection request from at least one third device (e.g., a mobile phone or a tablet) by at least one first device (e.g., the UE 101*c*). More specifically, the processes depicted in the diagram 700 include one or more UEs 101 (e.g., the UE 101*c*, the UE 101*a*, and the UE 101*b*). Further, a network process is represented by a thin vertical line and a step or message passed from one element to another is represented by horizontal arrows. In step 701, the UE 101*a* (e.g., the at least one second device) determines that the UE 101*c* is its master (minimally knowing its Bluetooth address) based, at least in part, on its touch-to-select capability (i.e., the UE 101*c* can detect the proximity of a Bluetooth device and obtain its Bluetooth address). In step 703, the UE 101*b* (e.g., the at least one third device) transmits a connection request to the UE 101*a* (e.g., the at least one second device). The UE 101*a* does not initially allow the connection and instead starts touch-to-be-selected discovery of the at least one first device (e.g., the UE 101*c*). In particular, the UE 101*a* may indicate this by various means (e.g., sound, light, vibration, UI display, etc.). Moreover, the UE 101*a* can start a timer to expect the touch of the at least one first device (e.g., the UE 101*c*) and if the timer expires before it receives a touch, the connection to the at least one third device (e.g., the UE 101*b*) is denied. In step 705, the UE 101*c* touches the UE 101*a*. As a result, in step 707, the connection between the UE 101*a* and the UE 101*b* is approved or "blessed" by the UE 101*c*, causing, at least in part, the UE 101*b* to enjoy at least one access to the one or more services associated with the UE 101*a* (e.g., mapping and/or navigation services, media services, multiplayer gaming services, etc.).

FIG. 7B depicts an example use case wherein the at least one first device can observe the proximity of at least one third device. The processes depicted in the diagram 730 also include one or more UEs 101 (e.g., the UE 101*c*, the UE 101*a*, and the UE 101*b*). Similar to step 701 in FIG. 7A, in step 731, the UE 101a (e.g., at least one second device) determines that the UE 101c is its master (minimally knowing its Bluetooth address) based, at least in part, on its touch-to-select capability. In step 733, similar to step 703 of FIG. 7A, the UE 101b (e.g., at least one third device) transmits a connection request to the UE 101a, which the UE 101a does not initially allow and instead starts touch-to-select discovery of the at least one first device (e.g., the UE 101c). However, in this instance, the UE 101a also initiates touch-to-select discovery of the at least one third device (e.g., the UE 101b). In step 735, the UE 101b touches the UE 101a, where the Bluetooth address of the UE 101b is minimally communicated to the UE 101a. In one embodiment, the UE 101c may also use the touch-to-select mechanism to minimally obtain the Bluetooth address of the at least one third device (e.g., the UE 101b). In step 737, the UE 101c can observe the proximity of the UE 101b and can then touch the UE 101a and therefore accept or "bless" the connection request of the UE 101b. Essentially, the UE 101c informs the UE 101a about the upcoming use by the UE 101b by the touching depicted in step 737. As a result, in step 739, the UE 101c enables the UE 101b to enjoy at least one access to one or more services associated with the UE 101a.

FIG. 8 is a diagram of user interfaces utilized in the processes of FIGS. 3-6, according to various embodiments. As shown, the example user interfaces of FIG. 8 include one or more user interface elements and/or functionalities created and/or modified based, at least in part, on information, data, and/or signals resulting from the processes (e.g., processes 300, 400, 500, and 600) described with respect to FIGS. 3-6. More specifically, FIG. 8 illustrates two user interfaces (e.g., interfaces 801 and 803) depicting at least one first device "C", at least one second device "A" (e.g., a vehicle, not shown for illustrative purposes), and at least one third device "B" (e.g., a mobile phone or a tablet), also not shown for illustrative purposes, but depicted by the notification 805. In particular, the at least one second device "A" knows that the interfaces 801 and 803 are its master (minimally knowing its Bluetooth address). Moreover, the interfaces 801 and 803 are in discoverable mode as depicted by the Bluetooth symbol 807. In this example use case, the interfaces 801 and 803 are paired to the at least one second device "A", however, this is not required.

In one embodiment, the system 100 first determines a connection request from the at least one third device "B" to access one or more of the one or more services associated with the at least one second device "A" (e.g., speed and fuel, loudspeakers, navigation, and/or multiplayer games), but the at least one second device "A" initially denies the connection request. Instead, the at least one second device "A" initiates a touch-to-select discovery of the at least one first device (e.g., interfaces 801 and 803) and the at least one third device "B". In one embodiment, prior to touching the at least one second device "A", the interfaces 801 and 803 may determine at least one restriction of the at least one access to one or more of the one or more services associated with the at least one second device "A" as depicted by the activated interface element 809. In one embodiment, once a user selects to restrict the one or more services, he or she may choose the specific one or more services to restrict as illustrated by display 811. In this example use case, because the user determined the at least one third device "B" will be used by a child, he or she will prevent the child from accessing the vehicle's loudspeakers. Thereafter, the owner of interfaces 801 and 803 can touch the at least one second device "A" (e.g., an access point associated with the vehicle) and therefore accept or "bless" the connection request of the at least one third device "B". As a result, the interfaces 801 and 803 enable the at least one third device "B" to enjoy at least one access to all of the services associated with the at least one second device "A" except the loudspeakers.

The processes described herein for brokering resources and services among multiple devices based on one or more touch-based interactions may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
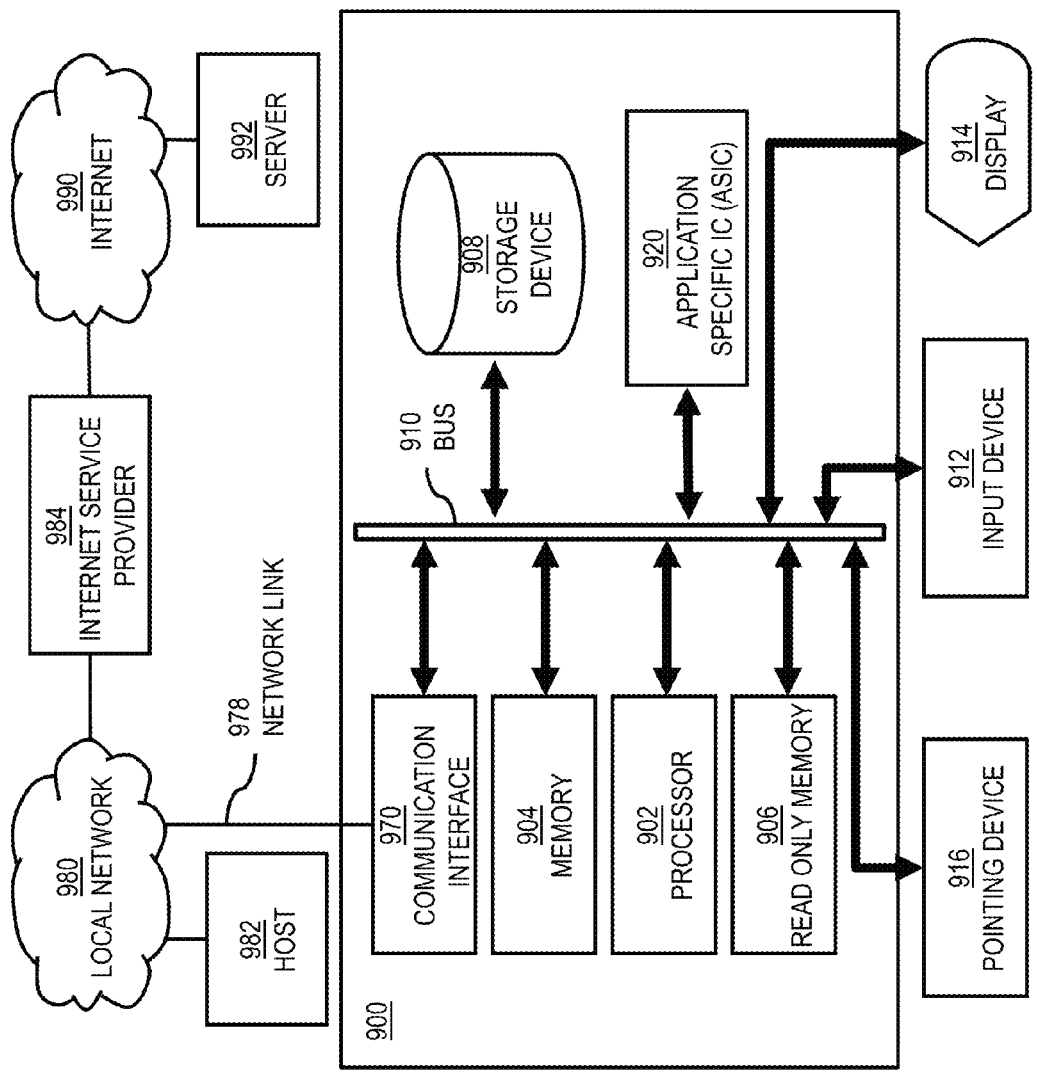
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to broker resources and services among multiple devices based on one or more touch-based interactions as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of brokering resources and services among multiple devices based on one or more touch-based interactions.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to broker resources and services among multiple devices based on one or more touch-based interactions. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for brokering resources and services among multiple devices based on one or more touch-based interactions. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for brokering resources and services among multiple devices based on one or more touch-based interactions, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for brokering resources and services among multiple devices based on one or more touch-based interactions to the UEs 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to broker resources and services among multiple devices based on one or more touch-based interactions as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of brokering resources and services among multiple devices based on one or more touch-based interactions.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to broker resources and services among multiple devices based on one or more touch-based interactions. The memory 1005 also stores the data associated with or generated by the execution of the inventive steps.

Figure 11:
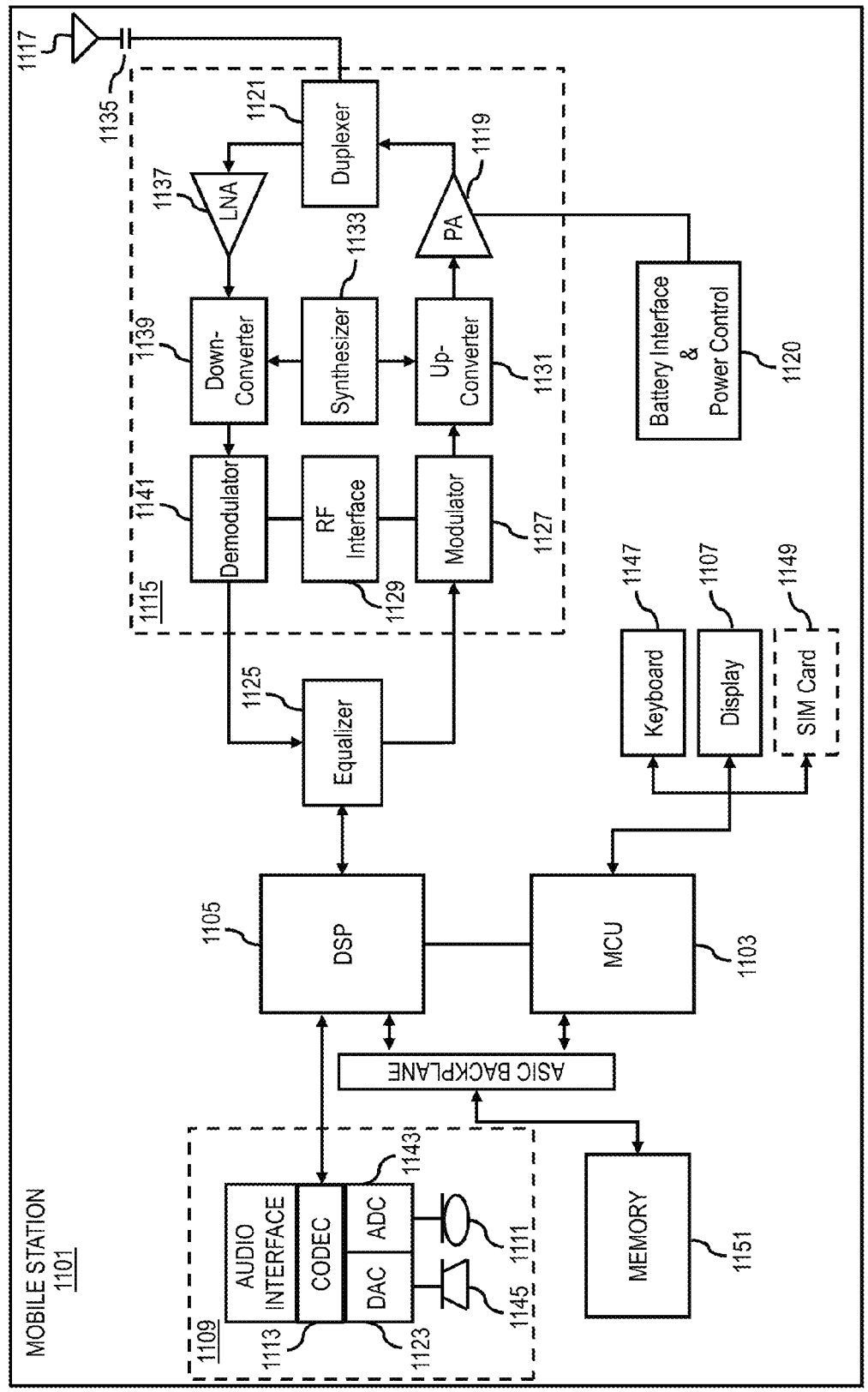
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of brokering resources and services among multiple devices based on one or more touch-based interactions. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of brokering resources and services among multiple devices based on one or more touch-based interactions. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to broker resources and services among multiple devices based on one or more touch-based interactions. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for enabling access from a first device to a second device in response to authorization provided with a third device, the method comprising:
   receiving an indication of one or more touch-based interactions with at least the first device, the third device, or a combination thereof indicating a connection request for access from the first device to the second device;
   causing display, on the third device, of a plurality of services available on the second device;
   receiving an authorization indication from the third device, wherein the authorization indication is indicative of a user input comprising a selection of at least one of the plurality of services to which access from the first device is enabled, wherein the user input comprising the selection is provided to the third device and authorizes the access from the first device to the second device; and
   in response to receiving the authorization indication from the third device of authorization of the access from the first device to the second device, enabling access from the first device to the selected service available on the second device via near field communication.

2. The method of claim 1, wherein the one or more touch-based interactions include, at least in part, one or more touch-to-select, touch-to-be-selected, proximity detection, or a combination thereof mechanisms.

3. The method of claim 1, further comprising:
   determining identification information associated with the first device; and
   processing the identification information to verify a master-slave relationship between the first device and the second device.

4. The method of claim 1, wherein the access is enabled for a predetermined amount of time based on at least one timer associated with the one or more touch-based interactions.

5. The method of claim 1, further comprising
   determining one or more restrictions associated with a restricted service of the second device; and
   preventing access to the restricted service of the second device.

6. The method of claim 1, wherein the connection request for access from the first device to the second device is initiated from the first device.

7. The method of claim 1, wherein the connection request for access from the first device to the second device is initiated from the third device.

8. The method of claim 1, wherein the authorization indication from the third device of authorization of the access from the first device to the second device comprises an indication of services of the second device authorized for access by the first device.

9. An apparatus for enabling access from a first device to a second device in response to authorization provided with a third device, the apparatus comprising:
   at least one processor; and
   at least one memory including computer program code for one or more programs,
   the at least one memory and the computer program code configured to, with the at least one processor, cause the apparatus to perform at least the following;
   receive an indication of one or more touch-based interactions with at least a first device, the third device, or a combination thereof indicating a connection request for access from the first device to the second device;
   cause display, on the third device, of a plurality of services available on the second device;
   receive an authorization indication from the third device, wherein the authorization indication is indicative of a user input comprising a selection of at least one of the plurality of services to which access from the first device is enabled, wherein the user input comprising the selection is provided to the third device and authorizes the access from the first device to the second device; and
   in response to receiving the authorization indication from the third device of authorization of the access from the first device to the second device, enable access from the first device to the selected service available on the second device via near field communication.

10. The apparatus of claim 9, wherein the one or more touch-based interactions include, at least in part, one or more touch-to-select, touch-to-be-selected, proximity detection, or a combination thereof mechanisms.

11. The apparatus of claim 9, wherein the at least one memory and the computer program code are further configured to cause the apparatus to:

determine identification information associated with the first device; and process the identification information to verify a master-slave relationship between the first device and the second device.

12. The apparatus of claim 9, wherein the access is enabled for a predetermined amount of time based on at least one timer associated with the one or more touch-based interactions.

13. The apparatus of claim 9, wherein the at least one memory and the computer program code are further configured to cause the apparatus to:

determine one or more restrictions associated with a restricted service of the second device; and prevent access to the restricted service of the second device.

14. The apparatus of claim 9, wherein the connection request for access from the first device to the second device is initiated from the first device.

15. The apparatus of claim 9, wherein the connection request for access from the first device to the second device is initiated from the third device.

16. The apparatus of claim 9, wherein the authorization indication from the third device of authorization of the access from the first device to the second device comprises an indication of services of the second device authorized for access by the first device.

17. The apparatus of claim 9, wherein the at least one memory and the computer program code are further configured to, with the at least one processor, cause the apparatus to:

cause display of a plurality of services on the third device; and receive an indication of selection of at least one service for access or restriction.

18. A computer program product for enabling access from a first device to a second device in response to authorization provided via a third device, the computer program product comprising at least one non-transitory computer-readable storage medium having computer-executable program code instructions stored therein, the computer-executable program code instructions comprising program code instructions to:

receive an indication of one or more touch-based interactions with at least the first device, the third device, or a combination thereof indicating a connection request for access from the first device to the second device;

cause display, on the third device, of a plurality of services available on the second device;

receive an authorization indication from the third device, wherein the authorization indication is indicative of a user input comprising a selection of at least one of the plurality of services to which access from the first device is enabled, wherein the user input comprising the selection is provided to the third device and authorizes the access from the first device to the second device; and in response to receiving the authorization indication from the third device of authorization of the access from the first device to the second device, enable access from the first device to the selected service available on the second device via near field communication.

* * * * *

UNITED STATES PATENT AND TRADEMARK OFFICE
CERTIFICATE OF CORRECTION

PATENT NO. : 9,606,619 B2  
APPLICATION NO. : 13/766321  
DATED : March 28, 2017  
INVENTOR(S) : Palin et al.

Page 1 of 1

It is certified that error appears in the above-identified patent and that said Letters Patent is hereby corrected as shown below:

In the Claims

Column 28,  
Line 17, "comprising" should read --comprising:--.  
Line 41, "following;" should read --following:--.

Signed and Sealed this  
Second Day of January, 2018

Joseph Matal  
*Performing the Functions and Duties of the*  
*Under Secretary of Commerce for Intellectual Property and*  
*Director of the United States Patent and Trademark Office*